United States Patent
Le Goff et al.

(10) Patent No.: US 6,438,127 B1
(45) Date of Patent: Aug. 20, 2002

(54) PROCESS AND APPARATUS FOR THE OPERATION OF VIRTUAL PRIVATE NETWORKS ON A COMMON DATA PACKET COMMUNICATION NETWORK

(75) Inventors: Herve Le Goff, Kelkheim; Norbert Haertelt, Mainz; Markus Hies, Wiesbaden; Helmut Oberheim, Frankfurt; Michael Schambach, Lampertheim, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/041,292

(22) Filed: Mar. 12, 1998

(30) Foreign Application Priority Data

Mar. 12, 1997 (DE) .......................................... 197 11 977
Feb. 27, 1998 (DE) .......................................... 198 09 824

(51) Int. Cl.[7] .......................................... H04L 12/2856
(52) U.S. Cl. .......................................... 370/389
(58) Field of Search .......................................... 370/389, 390, 370/392, 393, 395, 396, 398, 400, 401, 402; 709/227, 229

(56) References Cited

U.S. PATENT DOCUMENTS 5,633,869 A * 5/1997 Burnett et al. .............. 370/396
5,768,271 A * 6/1998 Seid et al. .................. 370/389
5,812,552 A * 9/1998 Arora et al. ............. 370/395.53
6,047,325 A * 4/2000 Jain et al. .................... 709/227
6,079,020 A * 6/2000 Liu ............................ 714/201
6,173,399 B1 * 1/2001 Gilbrech ..................... 713/153

* cited by examiner

Primary Examiner—Kwang Bin Yao
Assistant Examiner—Kevin C. Harper
(74) Attorney, Agent, or Firm—Cohen, Pontani, Lieberman & Pavane

(57) ABSTRACT

Economical and dependable networking of spatially separated branches of an organization is made possible for a plurality of individual subscribers with spatially separated branches by means of an arrangement and process for the operation of layer-3 virtual private networks (VPN A, VPN B) on a common data packet.communication network (e.g. OSI L3 data packet communication network 1). A logical separation of the layer-3 VPNs (VPNA, VPNB) is accomplished by allocating disjoint partial address spaces of a given homogeneous total address space to these L3 VPNs. A virtual private network identification number VPN ID is assigned to each L3 VPN and used to identify the disjoint partial address space by forming a part of the address. The VPN ID characterizing the L3 VPN starts at a fixed bit position in the individual subscriber address of each individual subscriber of the L3 VPN and may have a variable or a fixed length. Secure separation of the L3 VPNs is implemented by filtering of routing information and/or data packets based on the VPN ID.

18 Claims, 3 Drawing Sheets

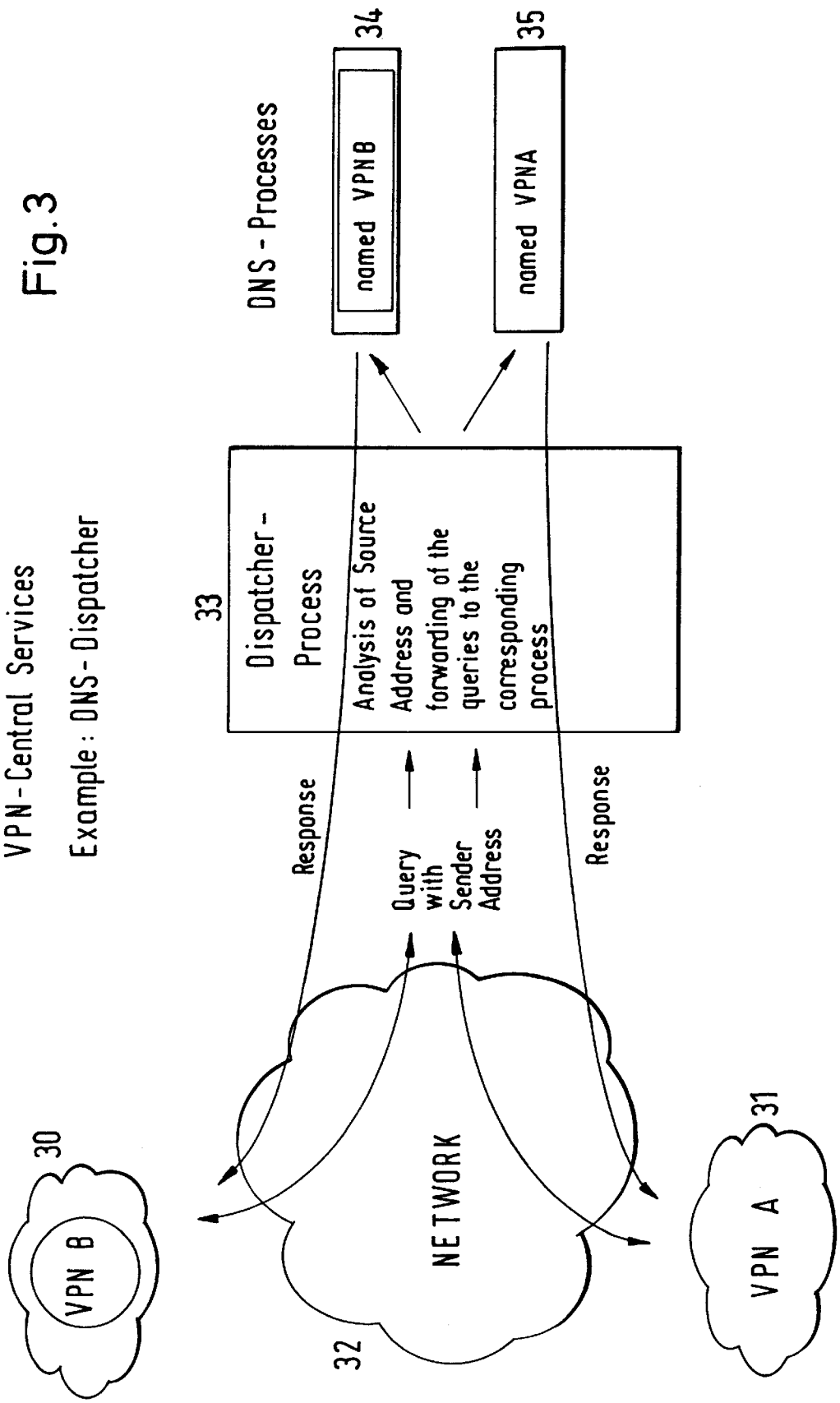

PROCESS AND APPARATUS FOR THE OPERATION OF VIRTUAL PRIVATE NETWORKS ON A COMMON DATA PACKET COMMUNICATION NETWORK

BACKGROUND OF THE INVENTION

1. Field of the Invention

The present invention is directed to a process and apparatus for the operation of virtual private networks on a common data packet switching or data packet communication network.

2. Description of the Related Art

The use of an intranet for internal communications within a corporation, business or enterprise is well known. The use of the term "intranet" is not standardized and ranges from network levels (Open Systems Interconnection (OSI) layer-3) to higher levels. Subscribers can communicate over the intranet of an enterprise with other subscribers within the enterprise. Furthermore, it is possible to communicate with subscribers outside of the intranet over outgoing connections of the intranet, as for example internet connections. Since intra-enterprise data should generally as a rule be protected against unauthorized access, at least the security-related data of an enterprise is not transmitted over the internet and the intranet within the enterprise is separated and protected from public access over the internet. Data packets are sent over a data packet communication intranet within the enterprise on OSI protocol layer-3 in network nodes (routers). In larger networks, several communication levels are used, wherein the upper communication levels are outfitted with efficient communication systems (routers) and output bandwidths to accommodate a bundling of data communication traffic. In an intranet of an enterprise that is tied into a public telecommunications network in a protected manner, services such as Name Server, Mail, World Wide Web access and Firewall are provided to prevent access from another network, as for example the internet.

The realization of this type of intranet is relatively costly. It is therefore the object of the present invention to provide an intranet that is flexible, economical and secure against external access.

SUMMARY OF THE INVENTION

In the present invention the term subscriber identifies a corporation, business or enterprise comprising a plurality or group of spatially separated individual subscribers. For example, a subscriber may be an enterprise with a plurality of spatially separated branch offices. The term individual subscriber is defined as individual computers and/or local area networks (LANs). An intranet for the spatially separated individual subscribers of the subscriber is realized, according to the invention, by a virtual private network (VPN) for the subscriber on a common data packet communication network, as for example data communication over a public telephone network of one or more carriers, the internet, or both, for a plurality of subscribers.

A partial address space of the given homogeneous total address space of the data packet communication network is allocated to the virtual private network of a subscriber such as a firm with a plurality of spatially separated branch offices. The virtual private network of subscriber is separated from the virtual private networks of other subscribers of the data packet communication network. In this respect, a predetermined area for an identification bit sequence for this virtual private network (VPN ID) is allocated in the address of every individual subscriber within the virtual private network. The VPN ID of the virtual private network is identical for every individual subscriber within the virtual private network, even those at remote locations. The separation of the virtual private networks is carried out by filtering data packets and routing information based on the VPN ID bits. The VPN separation is carried out on OSI network layer-3 (layer-3 VPN or L3 VPN).

The virtual private networks of individual subscribers are separated in such a way that when a subscriber of a virtual private network sends a data packet with a destination address containing the ID of his virtual private network, the data packet remains within the virtual private network. However, outgoing gateways, as for example to the internet or to other virtual private networks, can be set up from the virtual private network.

According to the invention, central services may be set up for a virtual private network separately from the central services of another virtual private network, so that these processes can operate independently on shared arrangements for different virtual private networks. For example, name servers of two virtual private networks can be implemented in a shared apparatus, but can run as separate processes which are not visible to one another. It is then possible to implement a central dispatcher process which assigns service inquiries from different VPNs to a VPN-specific service process based on the VPN ID.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 3 shows the spatially integrated, functionally separated composition of shared central services for the virtual private network of a data packet communication network using the example of domain-name services.

DETAILED DESCRIPTION OF THE PRESENTLY PREFERRED EMBODIMENTS

Figure 1:
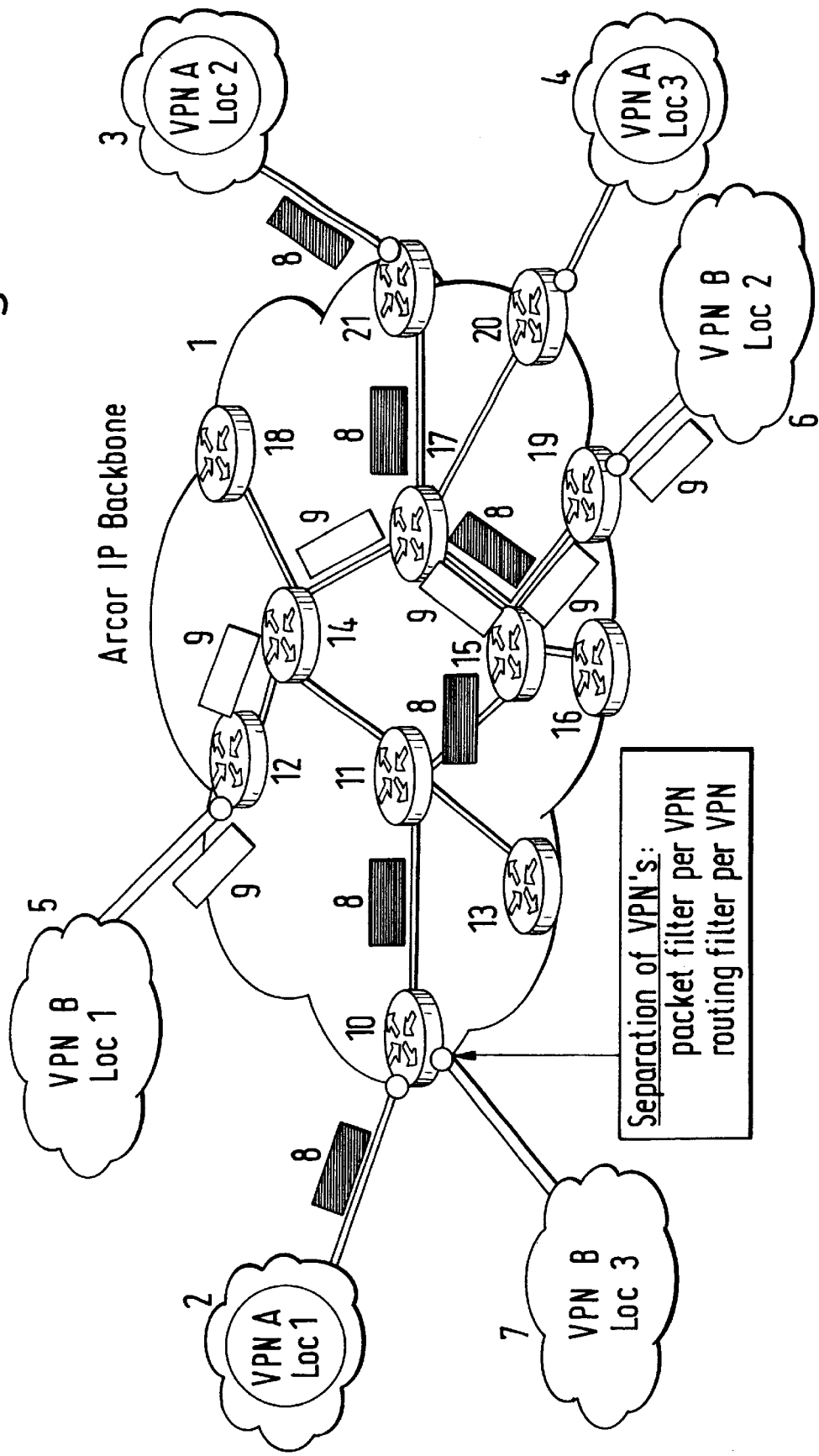
FIG. 1 shows a data packet communication network system in accordance with the present invention.

FIG. 1 depicts a data packet communication network 1, according to the invention, with two virtual private networks VPN A, VPN B. The data packet communication network may, for example, use OSI protocol, IPv4 protocol, IPv6 protocol or IPX protocol. One virtual private network VPN A comprises all local individual subscribers and local networks 2, 3 and 4 while another virtual private network VPN B comprises and connects all spatially separated local networks 5, 6 and 7. Data is transferred between a branch location 1 (LOC1) and a branch location 2 (LOC2) of a subscriber of the data packet communication network through the different VPNs (VPN A and VPN B) on a common OSI layer-3 data packet to communication network (Arcor IP Backbone). Separation of the VPNs is carried out by filtering data packets and routing information at network access points to the backbone network.

The network access points of local networks 2 to 7 to the data packet communication network 1 are represented by circles on the periphery of the data packet communication network 1. Data packets passing over the data packet communication network are represented as rectangles along connections between the local networks and the packet communication network, wherein, by way of example, the path for data packet 8 (VPN A) is shown from local network VPN A Loc1 (2) to local network VPN A Loc2 (3), and the path for data packet 9 (VPN B) is shown from VPN B locations 5 to 6.

Designating herein the VPNs, according to the invention, as layer-3 VPN means that the separation of VPNs is performed on OSI layer-3 (network layer L3) by filtering data packets and routing information with the VPN bits of an address of a packet.

The networking of the branches 2–4 of the first subscriber A and the networking of the branches 5–7 of the second subscriber B is provided by a common data packet communication network 1. However, a virtual separation of the networks of the two subscribers with respect to forwarding and use authorization, such as for services, is maintained in that there is provided within the overall data packet communication network a virtual private network VPN A for the first subscriber and a virtual private network VPN B for the second subscriber.

In the disclosed embodiment, only two virtual networks VPN A and VPN B, one per subscriber, on the data packet communication network 1 are shown by way of illustrative example. However, it is within the intended scope of the invention to provided virtual private networks for more than two subscribers.

The data packet communication network 1 is divided into L3 VPNs, that is into virtual private networks on layer-3 of the OS reference model.

The separation of the virtual private network VPN A of the first subscriber and the virtual private network VPN B of the second subscriber is carried out by the allocation of disjoint non-overlapping partial address spaces of the given total address space of the data packet communication network 1 to the subscribers of the data packet communication network. Accordingly, a first partial address space of the total address space of the data packet communication network 1 is assigned to the virtual private network VPN A of the first subscriber and a second partial address space of the total address space, which does not overlap with the first partial address space, is assigned to the virtual private network VPN B of the second subscriber.

The VPN separation is realized on layer 3 of the OSI reference model (OSI. layer-3 or OSI L3), that is on the network layer. In order to separate virtual networks A and B, a filtering of data packets and routing of information is utilized based on the VPN ID. The VPN ID is contained in a header of a packet which is transferred between two spatially separated local networks 2, 3 of a virtual private network A. The forwarding of a packet 8 on the path from a location 2 of a virtual network VPN A to another location 3 of the virtual network VPN A is carried out in the data packet communication network 1, as for example, via routers 10, 11, 15, 17, 21 or, alternatively, via routers 10, 11, 14, 17, 21.

The separation of the virtual private networks VPN A and VPN B from one another can be specially configured in different ways. Thus, individual subscribers of a virtual private network VPN A as well as individual subscribers of another virtual private network VPN B may be granted access to a partially shared address space (common address space) which is visible to all individual subscribers of these two virtual private networks VPN A and VPN B. In this common address space, a common infrastructure for central services can be realized in an economical manner for both virtual private networks VPN A and VPN B. In so doing, the common infrastructure can nevertheless be strictly separated with respect to the granting of authorized access to processes and/or data for the two virtual private networks VPN A and VPN B.

For example, two or more virtual private networks A, B may implement a common name server, wherein entirely or partially separated processes for the virtual private networks VPN A and VPN B operate on this common name server. The addresses that are visible from virtual network VPN A can by way of example differ from those that are visible from virtual network VPN B.

In the case of 2 transmission from one individual subscriber over the data packet communication network to another individual subscriber, the routing is carried out, especially with respect to the VPN bits of their VPNs, between the distribution layer and the access layer. Monitoring of the routing information and packet filters is automatically performed by a central configuration management using a database application.

The routing information is filtered using route maps and distribution lists on the corresponding interface of the distribution-layer router or point-of-presence router or local access points to the data packet communication network for individual subscribers and local LANs. Heavily accessed switching centers are equipped with highly efficient routers. No default route is entered in the routing table for packets with an unknown address at the access points of the data packet communication network.

Figure 2:
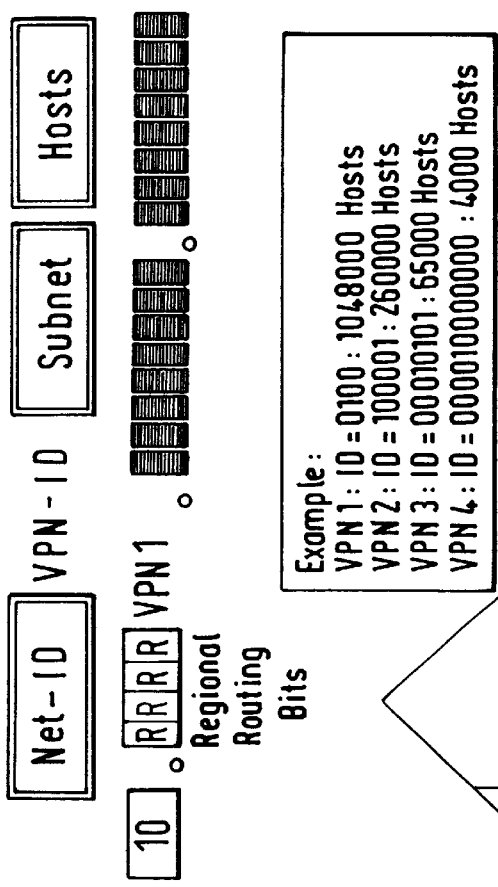
FIG. 2 shows the composition of a data packet communication network address.
Figure 4:
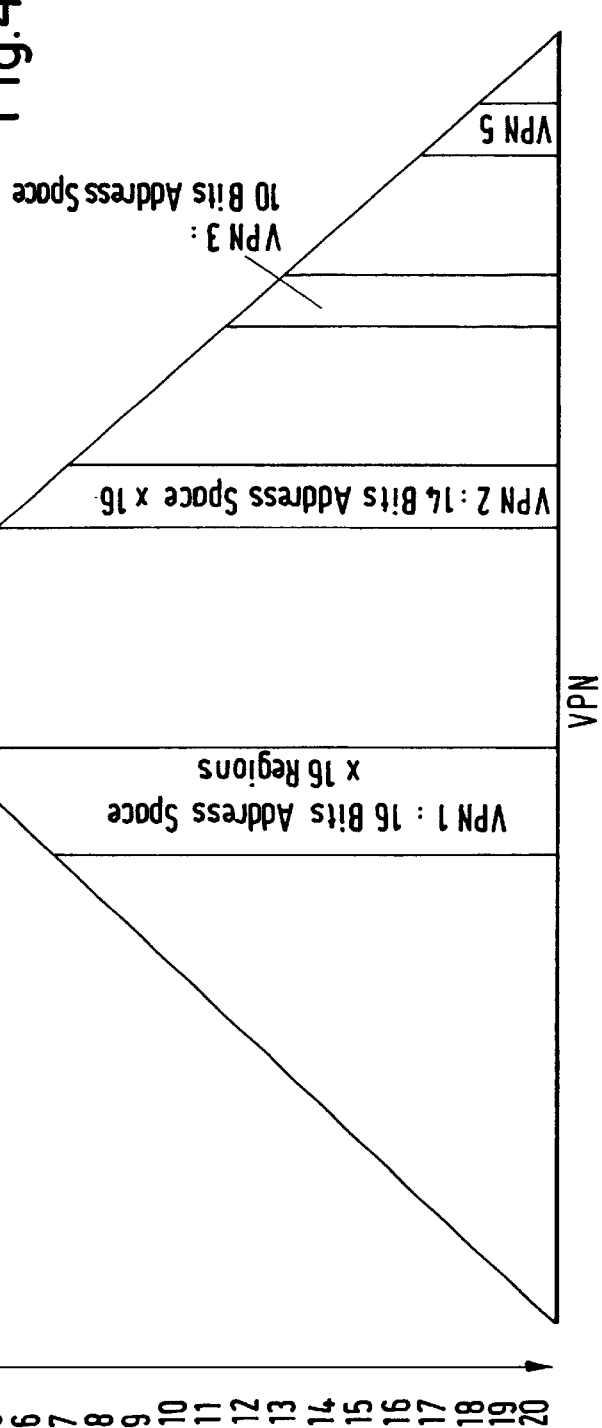
FIG. 4 is a list of different virtual private network IDs and a corresponding number of available host address numbers.

In FIG. 2, the total address space of a data packet communication network with an address length of 20 bits (IETF class A 10.0.0.0) is divided into partial address spaces for virtual private networks VPN1 to VPN 5 and additional partial address space. The composition of a data packet communication address comprising a network part (NET ID), a VPN part (VPN ID), and subnetworks and hosts is shown in FIG. 2 by way of illustrative example for IP addressing. This example contains a 4-bit regional routing portion which is equally divided for all VPNs. The remaining 20-bit address space is divided by the VPN ID into disjoint partial address spaces. FIG. 4 shows an example of 4 VPNs with different VPN ID lengths and a corresponding number of possible host addresses.

At the top of FIG. 2, the IP addresses are divided into a network identification 10 (IETF class A 10.0.0.0), regional routing bits (in this example, 4 bits), VPN bits, and individual subscriber bits (or individual subscriber host bits). The start of the VPN ID is fixed within the address of a data packet communication network. The length of the VPN ID can be fixed or variable. In relatively long VPN IDs, a relatively small number of bits are left over for individual subscribers or their hosts, while in a relatively short VPN ID a relatively large number of bits are left over for the individual subscriber ID or the individual subscriber host ID. For example, 16-bit VPN IDs/and 4-bit host IDs are possible, as are 12-bit VPN IDs and 8-bit host IDs or 4-bit VPN IDs and 16-bit host IDs. Alternatively, a subnetwork ID can be provided instead of the host ID. The VPN ID precedes the host ID or subnetwork ID.

FIG. 2 lists the size of the address space for the host ID as a function of the length of the VPN ID. The lefthand side of FIG. 2 lists 20 address bits for VPN ID and host ID with the first address bit at the top and increasing in number to the 20th address bit at the bottom. The left edge of the pyramid corresponds in the nth (n=1 ... 20) bit to a "0", the right edge to a "1", where n is the address bit corresponding to the address bits labeled on the left side of FIG. 2. One VPN ID may be assigned to each address bit on the left edge and each address bit on the right edge. This is one way of achieving separation of the virtual private network numbers. On the one hand, with a relatively long VPN ID, that is a VPN address space that starts relatively far down on the left hand side of FIG. 4, the address space of the VPN is relatively small. With a relatively short VPN ID, i.e. a VPN address space which starts relatively far up on the left hand side of FIG. 4 for the individual subscriber host address, there are a relatively large number of possible individual subscriber addresses in this VPN. For the virtual network VPN 1, the VPN ID length is 4 bits and, accordingly, the partial address space is 16 bits for the host ID in 16 regions, respectively. For the smaller virtual private network VPN 2, the VPN ID length is 6 bits and the partial address space for the host IDs is accordingly 14 bits in the regions. In the case of VPN 4 which is even smaller, the length of the VPN ID is 12 bits and the length of the host ID is accordingly 8 bits, that is an 8-bit address space within the virtual private network 3. As is shown in FIG. 4, a relatively large address space is available for the VPN in a relatively short VPN ID.

The authorization of a VPN or of every individual subscriber of a local network of this VPN for penetration certain central services can be checked on the basis of the VPN ID in the sender address of an individual subscriber. The sender address of the individual subscriber of a VPN desiring to use a certain central service in the data packet communication network is transmitted as a sender address with the service use query to the central service and can be checked in this way.

It is also possible to implement a dispatcher process as a central service for a virtual private network in the data packet communication network which allocates service queries from the virtual private network to VPN-specific service processes based on the VPN ID.

A domain-name server (DNS) dispatcher process 33 can assign a domain-name service query (DNS query) to a VPN-specific name server process 34, 35 based on the VPN ID of the sender of the query, as shown in FIG. 3. The processes can be implemented on a common infrastructure. The named VPNB process 34 is assigned to the VPNB 30 and, in a corresponding manner, the named VPNA process 35 is assigned to the VPNA 31.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A process for operation of a plurality of layer-3 virtual private networks on a common data packet communication network, comprising the steps of:

allocating a disjoint partial address space of a predetermined homogeneous total address space of the common data packet communication network to each of the virtual private networks so as to separate the plural virtual private networks;

assigning a virtual private network identification number to each virtual private network to identify the disjoint partial address space of the each virtual private network, said virtual private network identification number comprising as part of an address of every one of plural individual subscribers of the each virtual private network and starting at a fixed bit position in an individual subscriber address of each of the plural individual subscribers of the each layer-3 virtual private network; and filtering data packets and routing information moving through the communication network using routers of the data packet communication network based on the virtual private network identification number.

2. The process in accordance with claim 1, further comprising the step of making a common address space of the total address space visible to specific one of the plural virtual private networks so as to enable access to central services of a common network infrastructure from the specific virtual private networks.

3. The process in accordance with claim 2, further comprising the step of checking an individual subscriber of one of the plural layer-3 virtual private networks for authorization to access predetermined central services and separating the central services for different ones if the plural layer-3 virtual private networks based on the virtual private network identification number in a sender address of the individual subscribers and on a destination address of the central service.

4. The process in accordance with claim 1, wherein the data packet communication network comprises one of an open systems interconnection protocol, IPv4 protocol, IPv6 protocol and IPX protocol network.

5. The process in accordance with claim 1, further comprising the step of assigning service queries to virtual private network specific service processes using a dispatcher process based on the virtual private network identification number.

6. The process in accordance with claim 1, further comprising the step of assigning a domain name service query to virtual private network specific service processes using a domain-name server dispatcher process based on the virtual private network identification number of a sender.

7. The process in accordance with claim 1, wherein the communication network comprises an open systems interconnection layer-3 data packet communication network.

8. The process in accordance with claim 1, wherein the virtual private network identification number is of fixed length.

9. A process for operation of a plurality of layer-3 virtual private networks on a common data packet communication network, comprising the steps of:

allocating a disjoint partial address space of a predetermined homogeneous total address space of the common data packet communication network to each of the virtual private networks so as to separate the plural virtual private networks;

assigning a virtual private network identification number to each virtual private network to identify the disjoint partial address space of the each virtual private network, said virtual private network identification number comprising as part of an address of every one of plural individual subscribers of the each virtual private network and starting at a fixed bit position in an individual subscriber address of each of the plural individual subscribers of the each layer-3 virtual private network, wherein the virtual private network identification number is of variable length; and filtering data packets and routing information moving through the communication network using routers of the data packet communication network based on the virtual private network identification number.

10. A system comprising:

a common data packet communication network;

a plurality of layer-3 virtual private networks connected to the data packet communication network, each said virtual private network comprising a plurality of individual subscribers such having an individual subscriber address, being separated from one another by a disjoint partial address space of a total address space of said common data packet communication network, assigned to each said virtual private network and being identified by a virtual private network identification number that forms part of and starts at a fixed bit position in an individual subscriber address of each individual subscriber of said each virtual private network; and means for filtering data packets and routing information moving through the communication network in routers of said common data packet communication network based on the virtual private network identification number.

11. The system in accordance with claim 10, wherein said common network comprises an infrastructure for central services accessible by the individual subscribers of said virtual private networks by making visible a common address space of said total address space for specific ones of said plural virtual private networks.

12. The system in accordance with claim 11, further comprising:

means for checking authorization of the individual subscribers of the plural layer-3 virtual private networks for authorization to access predetermined central services; and means for separating the central services for different ones of the plural layer-3 virtual private networks based on the virtual private network identification number in a sender address of the individual subscribers and on a destination address of the central service.

13. The system in accordance with claim 12, wherein said common data packet communication network comprises one of an open systems interconnection protocol, IPv4 protocol, IPv6 protocol and IPX protocol network.

14. The system in accordance with claim 10, further comprising a dispatcher process for assigning service queries to virtual private network specific service processes based on the virtual private network identification number.

15. The system in accordance with claim 10, further comprising a domain name service dispatcher for assigning a domain name service query to virtual private network specific service processes based on the virtual private network identification number of a sender.

16. The system in accordance with claim 10, wherein said data communication network comprises an open systems interconnection layer-3 data packet communication network.

17. The system in accordance with claim 10, wherein the virtual private network identification number is of fixed length.

18. A system comprising:

a common data packet communication network;

a plurality of layer-3 virtual private networks connected to the data packet communication network, each said virtual private network comprising a plurality of individual subscribers such having an individual subscriber address, being separated from one another by a disjoint partial address space of a total address space of said common data packet communication network, assigned to each said virtual private network and being identified by a viral private network identification number that forms part of and starts at a fixed bit position in an individual subscriber address of each individual subscriber of said each virtual private network, wherein the virtual private network identification number is of variable length; and means for filtering data packets and routing information moving through the communication network in routers of said common data packet communication network based on the virtual private network identification number.

* * * * *